United States Patent
Park et al.

(10) Patent No.: US 11,433,492 B2
(45) Date of Patent: Sep. 6, 2022

(54) HEAT EXCHANGER AUTOMATIC ASSEMBLY APPARATUS AND METHOD

(71) Applicants: Hanon Systems, Daejeon (KR); JMT CO., LTD., Gwangju (KR)

(72) Inventors: Jong Eun Park, Daejeon (KR); Yong Hwan Joo, Gwangju (KR)

(73) Assignee: Hanon Systems, Daejeon (KR)

( * ) Notice: Subject to any disclaimer, the term of this patent is extended or adjusted under 35 U.S.C. 154(b) by 164 days.

(21) Appl. No.: 16/740,782

(22) Filed: Jan. 13, 2020

(65) Prior Publication Data

US 2020/0223019 A1 Jul. 16, 2020

(30) Foreign Application Priority Data

Jan. 14, 2019 (KR) .................. 10-2019-0004410
Jan. 14, 2019 (KR) .................. 10-2019-0004450

(51) Int. Cl.
*B23P 15/26* (2006.01)

(52) U.S. Cl.
CPC ........... *B23P 15/26* (2013.01); *F28F 2275/00* (2013.01); *F28F 2280/00* (2013.01)

(58) Field of Classification Search
CPC ......... B23P 15/26; B23P 19/001; B23P 19/02; F28F 2275/00; F28F 2280/00; B21D 53/02

See application file for complete search history.

(56) References Cited

U.S. PATENT DOCUMENTS 6,332,266 B1 12/2001 Park et al.
2006/0112540 A1 6/2006 Tochigi et al.

FOREIGN PATENT DOCUMENTS

| JP | 4830626 B2 * | 12/2011 |
| JP | 4830626 B2 | 12/2011 |
| JP | 2012011480 A * | 1/2012 |
| JP | 2012011480 A | 1/2012 |
| KR | 100696997 B1 | 3/2007 |
| KR | 20090021497 A | 3/2009 |

OTHER PUBLICATIONS

Ezaki, Susumu et al., JP-4830626-B2 Machine Translation (Year: 2011).*
JP-4830626-B2, Ezaki Machine translation (Year: 2011).*

* cited by examiner

*Primary Examiner* — Lee A Holly
(74) *Attorney, Agent, or Firm* — Norton Rose Fulbright US LLP; James R. Crawford

(57) ABSTRACT

Provided is a heat exchanger automatic assembly apparatus including: a fin distribution unit distributing fins; a fin transfer unit including two or more fin trays and a driving means connected to the fin trays, respectively, to selectively transfer the fin trays to a predetermined position; and a fin discharge unit discharging the fins stored in the fin trays of the fin transfer unit to the predetermined position. The fins may be continuously supplied to the fin trays without stopping the supply of the fins to the fin trays and the plurality of fins may be discharged at one time to allow the fins to be interposed between the tubes arranged to be spaced apart from each other, thereby reducing a supply time of the fin to improve productivity, and reducing discarded fins to reduce the manufacturing cost.

7 Claims, 20 Drawing Sheets

HEAT EXCHANGER AUTOMATIC ASSEMBLY APPARATUS AND METHOD

CROSS-REFERENCE TO RELATED APPLICATIONS

This application claims priority under 35 U.S.C. § 119 to Korean Patent Application No. 10-2019-0004410, filed on Jan. 4, 2019, and No. 10-2019-0004450, filed on Jan. 14, 2019, in the Korean Intellectual Property Office, the disclosure of which is incorporated herein by reference in its entirety.

TECHNICAL FIELD

The following disclosure relates to a heat exchanger automatic assembly apparatus and method for supplying fins between tubes to allow a core for a heat exchanger consisting of a plurality of fins and a plurality of tubes to be automatically assembled.

BACKGROUND

A heat exchanger is an apparatus in which heat exchange fluid is introduced, the introduced heat exchange fluid is transferred to a tube having a fin to cool or heat the tube, and heat of the heat exchange fluid is radiated or heated to flow out the heat exchange fluid.

In such a heat exchanger, a core is assembled by alternately stacking the tube and the fin, which is assembled by a heat exchanger automatic assembly apparatus.

In the heat exchanger automatic assembly apparatus, fins are first manufactured while passing through a fin manufacturing apparatus, and then the fins are passed through a fin supply apparatus and then supplied between a tube and a tube disposed to be spaced apart from the tube in advance, and the tubes and the fins are compressed in a stacking direction in a stacked state to form a core temporary assembly.

However, since the conventional heat exchanger automatic assembly apparatus has a structure for supplying the processed fins one by one, it is impossible to supply a plurality of fins at one time. As a result, a supply time of the fin is long, resulting in low productivity. In addition, when a failure occurs in the assembly process, the manufacturing of the fin is made continuously, but a chain stop of the assembly apparatus occurs, and as a result, a number of the processed fins are discarded to increase the manufacturing cost of the heat exchanger.

In addition, since the conventional heat exchanger automatic assembly apparatus has a structure of supplying the fin between one tube and a feeding screw while supplying one tube to the feeding screw, the conventional heat exchanger automatic assembly apparatus has to wait for a completion of supply of one fin to supply one tube to the feeding screw.

That is, the conventional heat exchanger automatic assembly apparatus may not supply a plurality of tubes and a plurality of fins at one time, and thus the supply time of the tubes and fins takes a long time, resulting in low productivity and increased manufacturing cost of the heat exchanger.

RELATED ART DOCUMENT

Patent Document

KR 10-0696997 B1 (2007.03.13)

SUMMARY

An embodiment of the present invention is directed to providing a heat exchanger automatic assembly apparatus and method capable of continuously supplying fins to fin trays without stopping the fin supply by using two or more fin trays, and discharging a plurality of fins at one time to allow the fins to be interposed between tubes arranged to be spaced apart from each other.

An embodiment of the present invention is directed to providing a heat exchanger automatic assembly apparatus and method capable of reducing a transfer time and an assembly time of tubes and fins by supplying a plurality of tubes at one time and supplying a plurality of fins at one time to assemble a large number of tubes and a large number of fins at one time.

In one general aspect, a heat exchanger automatic assembly apparatus includes: a fin distribution unit distributing fins introduced from one side and supplying the fins to the other side; a fin transfer unit connected to the other side of the fin distribution unit and including two or more fin trays in which the fins distributed through the fin distribution unit are stored, and a driving means connected to the fin trays, respectively, to selectively transfer the fin trays to a predetermined position; and a fin discharge unit discharging the fins stored in the fin trays of the fin transfer unit to the predetermined position.

The fin distribution unit may continuously supply the fins to the fin transfer unit.

The fins of a plurality of columns stored in the fin trays of the fin transfer unit may be discharged to the predetermined position at one time by the fin discharge unit.

The fin distribution unit may include: a fin introduction line to which the fins are introduced; a first fin distribution line and a second fin distribution line through which the fins are discharged; and a redirection apparatus having one side connected to the fin introduction line and the other side connected to the first fin distribution line and the second fin distribution line, and selectively connecting any one of the first fin distribution line and the second fin distribution line to the fin introduction line.

The fin transfer unit may include: a first fin tray and a second fin tray disposed to be adjacent to a discharge point of the first fin distribution line and a discharge point of the second fin distribution line, respectively, and disposed to be spaced apart from each other; and a first tray driving means and a second tray driving means connected to the first fin tray and the second fin tray, respectively, to move the first fin tray and the second fin tray to a position between the first fin tray and the second fin tray facing each other and return the first fin tray and the second fin tray to original positions.

The fin discharge unit may include: a pusher disposed on a line intersecting a line connecting a first fin tray and a second fin tray of the fin transfer unit and pushing the fins; and a pusher driving means connected to the pusher to move the pusher in a direction intersecting the line connecting the first fin tray and the second fin tray and return the pusher to an original position.

The heat exchanger automatic assembly apparatus may further include a guide part disposed on a line through which the pusher of the fin discharge unit is moved and disposed to be adjacent to the fin transfer unit to guide the discharge of the fins pushed by the pusher.

The guide part may include: a guide tray guiding and storing the fins discharged from the fin transfer unit; and a guide tray driving means connected to the guide tray to move the guide tray in the direction intersecting the line connecting the first fin tray and the second fin tray.

In another general aspect, a heat exchanger automatic assembly method includes: a fin distribution step of distributing fins which are continuously introduced at a specific time interval and supplying the fins to any one of two or more discharge points; a fin storing step of storing the distributed and stored fins in any one of two or more fin trays; a fin storing switching step of storing the fins in an empty fin tray by supplying the fins to the other discharge point when the storing of a predetermined number of fins in any one fin tray is completed; a fin discharge step of moving the fin tray where the storing of the fins is completed to a predetermined position and then discharging the stored fins to the predetermined position; and a fin tray return step of returning the fin tray where the discharge of the fins is completed to an original position, wherein the fin storing switching step, the fin discharge step, and the fin tray return step are repeatedly performed in sequence.

In the fin storing switching step, when the storing of the predetermined number of fins in any one fin tray is completed, the fins may be stored in the empty fin tray by supplying the fins to the other discharge point without stopping the introduction of the fins.

Until the storing of the predetermined number of fins in any one fin tray is completed by performing the fin distribution step and the fin storing step for any one fin tray, the fin discharge step and the fin tray return step may be performed for the other fin tray and completed.

In the fin discharge step, the fins stored in the fin tray may be discharged at one time.

The fin discharge step may further include a guide tray reciprocating step of, by a guide tray, transferring the fins stored in the fin tray to the next process while reciprocating between the fin tray where the storing of the fins is completed and the next process.

In another general aspect, a heat exchanger automatic assembly apparatus includes: a tube supply unit supplying tubes; a tube transfer unit in which the tubes supplied from the tube supply unit are stored to be spaced apart from each other; a tube and fin transfer unit including a pair of feeding screws disposed side by side to be spaced apart from each other and into which a plurality of tubes supplied at one time from the tube transfer unit are inserted and seated, and a screw driving means connected to the feeding screws to rotate the feeding screws; and a fin supply part supplying a plurality of fins to the tube and fin transfer unit at one time, wherein in the tube and fin transfer unit, the fins which are waiting in advance are inserted between the tubes inserted and seated between the pair of feeding screws, and when two tubes and one fin between the two tubes are referred to as one set, a plurality of sets are assembled at one time.

The tube supply unit may supply the tubes to the tube transfer unit one by one at a specific cycle.

The tube supply unit may include: a single tube supply apparatus having a tube seating portion formed to be concave in an outer circumference surface and a catching protrusion protruding at the rear of the tube seating portion in a rotational direction adjacent to the tube seating portion; a rotation shaft coupled to the single tube supply apparatus and formed to be rotatable together with the single tube supply apparatus; and a driving means connected to the rotation shaft to rotate the rotation shaft.

The tube transfer unit may include: a tube shuttle in which tube seating grooves into which the tubes are inserted are formed to be spaced apart from each other in a width direction; a shuttle vertical movement means coupled to the tube shuttle to move the tube shuttle in a height direction; and a shuttle driving means connected to the tube shuttle to move the tube shuttle in the width direction.

The tube shuttle, the shuttle vertical movement means, and the shuttle driving means of the tube transfer unit may be integrally formed, and the tube transfer unit may be coupled to a fixed frame by an LM guide so as to be movable in the width direction.

A plurality of single tube supply apparatuses of the tube supply unit may be provided to be spaced apart from each other in a length direction, a pair of tube transfer units may be provided to be spaced apart from each other in the length direction, and the tube and fin transfer unit may have the screw driving means connected to each feeding screw one by one, and the single tube supply apparatus, the tube transfer unit, the feeding screw, and the screw driving means may be integrally formed in one set, one by one, and a gap between two sets spaced apart in the length direction may be adjustable.

The heat exchanger automatic assembly apparatus may further include a tube and fin discharge unit fixing and transferring a tube and fin stacking body in which the tubes and the fins discharged from the tube and fin transfer unit are stacked.

In another general aspect, a heat exchanger automatic assembly method includes: a tube storing step of storing tubes to be spaced apart from each other in a tube shuttle; a tube transfer step of inserting and seating the stored tubes between a pair of feeding screws disposed to be spaced apart from each other, by moving the tube shuttle to a predetermined position when the storing of a predetermined number of tubes in the tube shuttle is completed; a tube and fin assembly step of assembling a plurality of sets at one time when two tubes and one fin between the two tubes are referred to as one set, by inserting fins which are waiting in advance between the tubes inserted and seated between the pair of feeding screws; and a tube and fin stacking body discharge step of discharging a tube and fin stacking body constituted by a plurality of tubes and a plurality of fins for which the assembly is completed to one side by rotating the pair of feeding screws.

The heat exchanger automatic assembly method may further include, after the tube and fin stacking body discharge step, a tube and fin stacking body transfer step of fixing and transferring the discharged tube and fin stacking body.

DETAILED DESCRIPTION OF EMBODIMENTS

Hereinafter, a heat exchanger automatic assembly apparatus and method according to the present invention having the configuration as described above will be described in detail with reference to the accompanying drawings.

Figure 1:
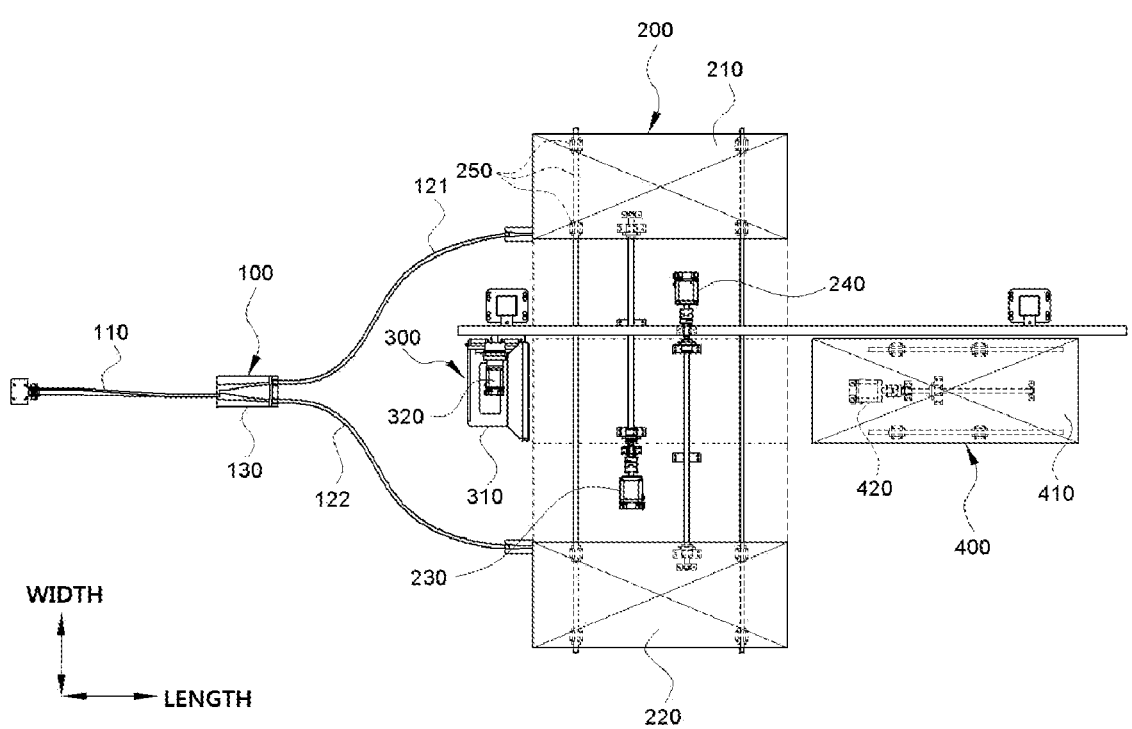
FIG. 1 is a top plan view illustrating a heat exchanger automatic assembly apparatus according to an embodiment of the present invention.
Figure 2:
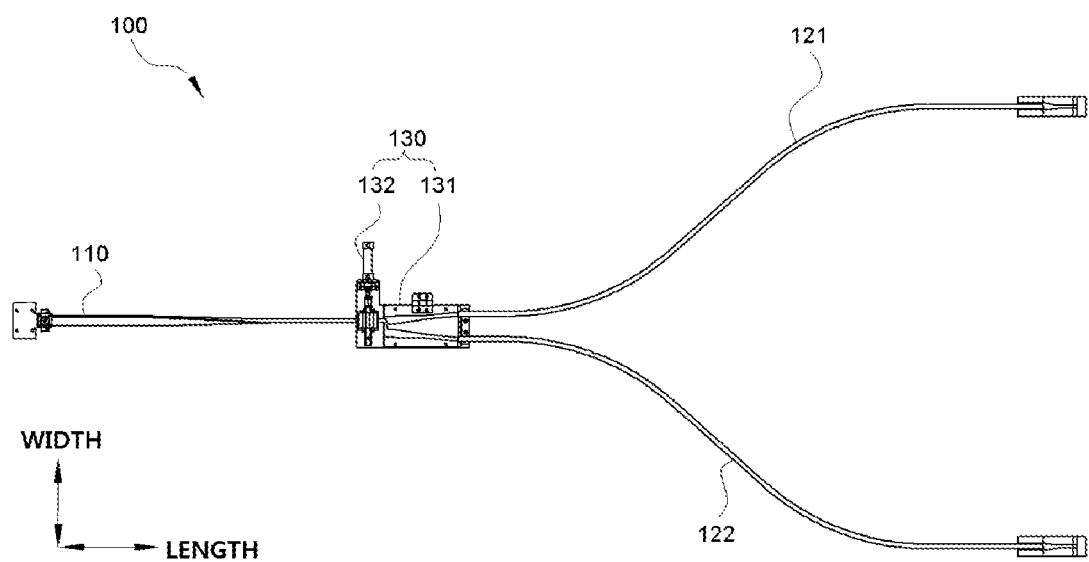
FIGS. 2 and 3 are top plan views illustrating a fin distribution unit and a direction switching apparatus of the fin distribution unit of the heat exchanger automatic assembly apparatus according to an embodiment of the present invention.
Figure 3:
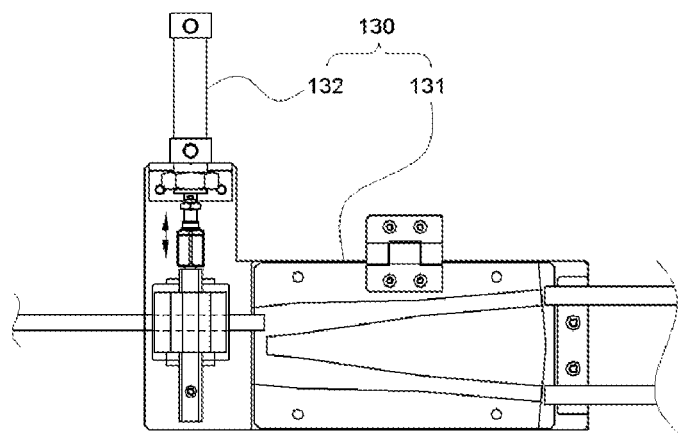
Figure 5:
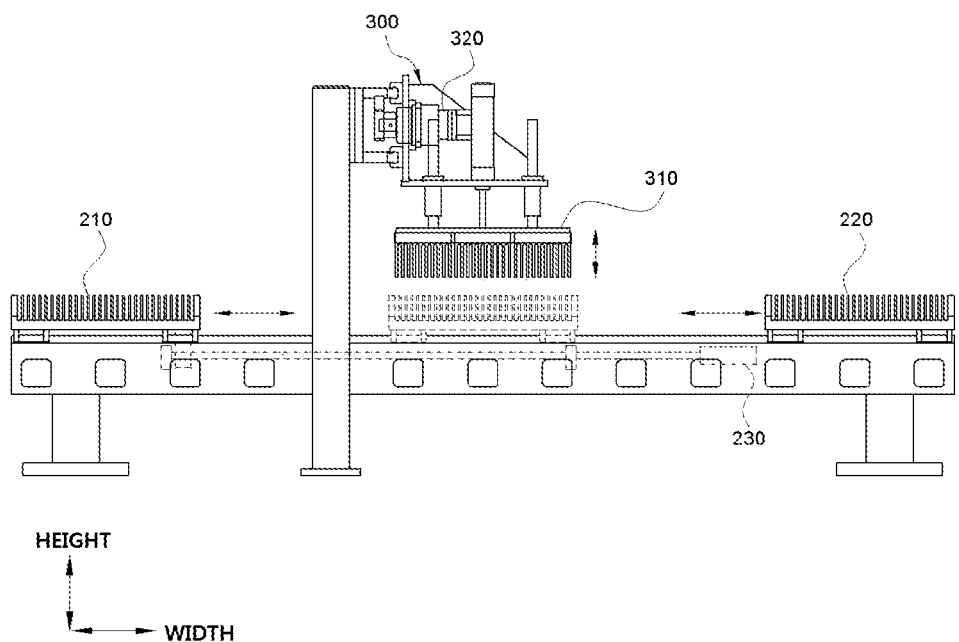
FIGS. 5 and 6 are a left side view and a perspective view illustrating the fin transfer unit and the fin discharge unit of the automatic heat exchanger assembly apparatus according to an embodiment of the present invention.
Figure 6:
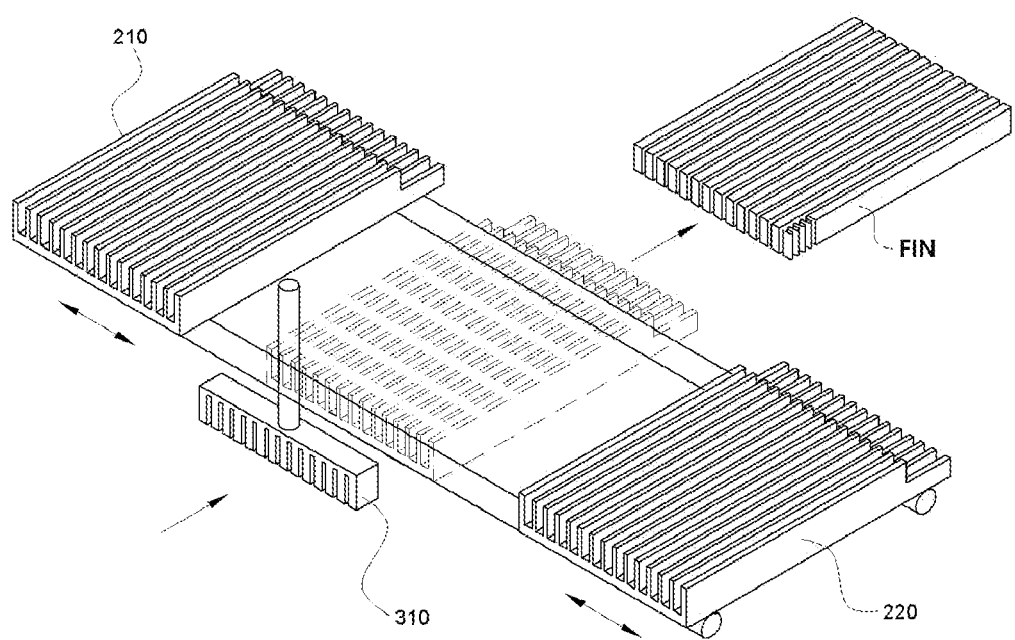

FIG. 1 is a top plan view illustrating a heat exchanger automatic assembly apparatus according to an embodiment of the present invention, FIGS. 2 and 3 are top plan views illustrating a fin distribution unit and a direction switching apparatus of the fin distribution unit of the automatic heat exchanger assembly apparatus according to an embodiment of the present invention, and FIGS. 5 and 6 are a left side view and a perspective view illustrating the fin transfer unit and the fin discharge unit of the automatic heat exchanger assembly apparatus according to an embodiment of the present invention.

Referring to FIG. 1, a heat exchanger automatic assembly apparatus according to an embodiment of the present invention may include a fin distribution unit 100, a fin transfer unit 200, a fin discharge unit 300, and a guide part 400.

Referring to FIG. 2, the fin distribution unit 100 serves to distribute fins introduced from one side and to supply the fins to the other side. In this case, one side of the fin distribution unit 100 is connected to a fin manufacturing apparatus such that the fins continuously produced at a specific cycle in the fin manufacturing apparatus may be introduced to one side of the fin distribution unit 100. In addition, the fin distribution unit 100 may include a fin introduction line 110 into which the fins are introduced, a first fin distribution line 121 and a second fin distribution line 122 through which the fins are discharged, and a redirection apparatus 130. The fin introduction line 110, the first fin distribution line 121, and the second fin distribution line 122 are paths through which the fins may pass, and the redirection apparatus 130 may be connected to a portion where three lines meet. As a result, by the redirection apparatus 130, the fin introduction line 110 may be connected to the first fin distribution line 121 and may be disconnected from the second fin distribution line 122, or on the contrary, by the redirection apparatus 130, the fin introduction line 110 may be connected to the second fin distribution line 122 and may be disconnected from the first fin distribution line 121. Here, referring to FIG. 3, the redirection apparatus 130 may include a branch portion 131 having a branch passage through which the fin may pass, and a switching means 132 for switching the path through which the fin is moved. The branch portion 131 may be formed with a branch passage divided into two paths. The switching means 132 is coupled to a right end portion of the fin introduction line 110 in a length direction and may be operated so that the other end of the fin introduction line 110 is connected to a passage of a rear side (upper side on the view) in a width direction or to a passage of a front side (lower side on the view) in the width direction of the branch passages formed in the branch portion 131 according to a linear movement of the switching means 132 in the width direction. As a result, the fins introduced along the fin introduction line 110 may be moved along the first fin distribution line 121 through the redirection apparatus 130 and may be supplied toward a first fin tray 210 of the fin transfer unit 200 through a right end of the first fin distribution line 121 which is one discharge point. Alternatively, the fins introduced along the fin introduction line 110 may be moved along the second fin distribution line 122 through the redirection apparatus 130 and may be supplied toward a second fin tray 220 of the fin transfer unit 200 through a right end of the second fin distribution line 122 which is the other discharge point.

Figure 4:
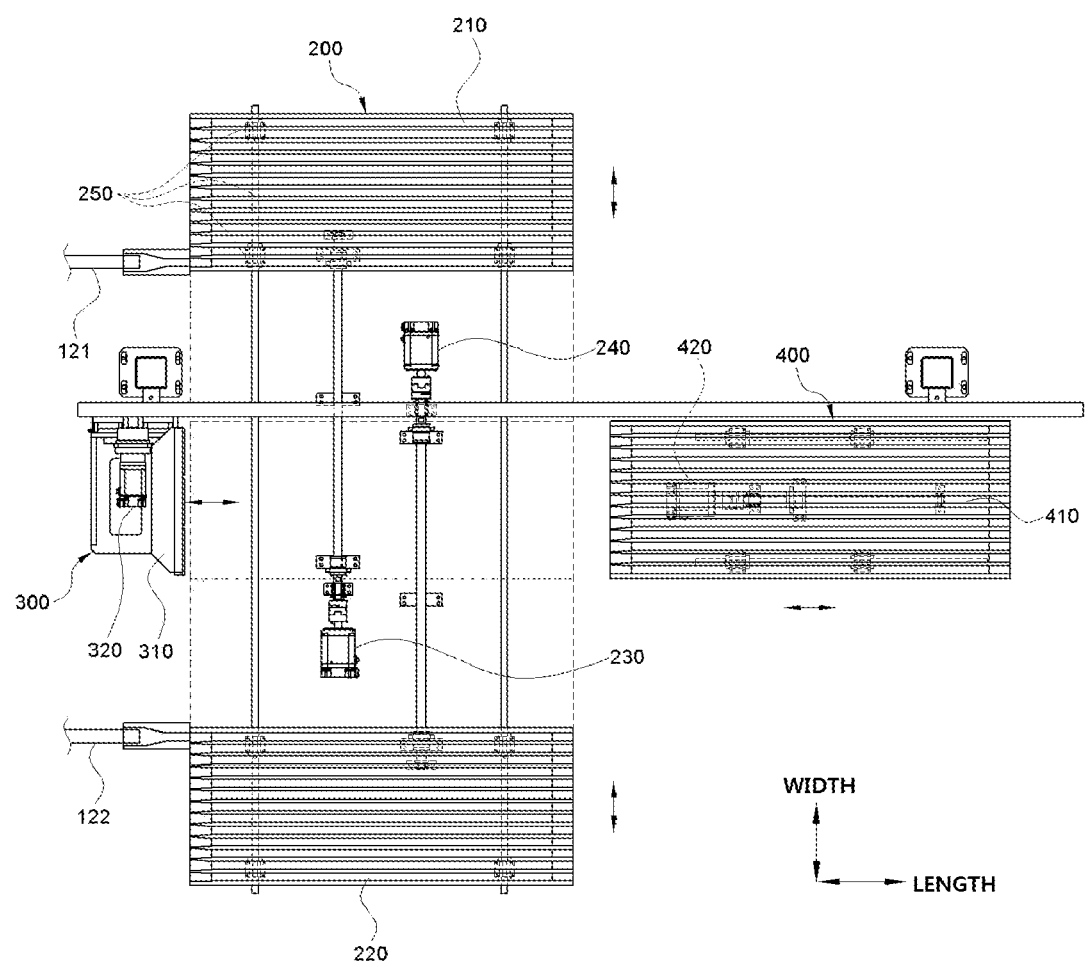
FIG. 4 is a top plan view illustrating a fin transfer unit, a fin discharge unit, and a guide part of the automatic heat exchanger assembly apparatus according to an embodiment of the present invention.

Referring to FIGS. 4 to 6, the fin transfer unit 200 serves to store the fins supplied through the fin distribution unit 100 and transfer the fins to a predetermined position. The fin transfer unit 200 may include a first fin tray 210, a second fin tray 220, a first tray driving means 230, a second tray driving means 240, and an LM guide 250. Fin seating grooves may be formed to be concave in upper surfaces of the first fin tray 210 and the second fin tray 220 so as to store the supplied fins. In this case, the fin seating groove may be formed continuously from a left side of the fin tray to a right side thereof in the length direction, and a plurality of fin seating grooves may be formed side by side to be spaced apart in the width direction. In addition, the first fin tray 210 and the second fin tray 220 may be disposed side by side to be spaced apart from each other at the rear and the front in the width direction. In addition, the first fin tray 210 and the second fin tray 220 may be coupled to the LM guide 250 and guided to linearly move in the width direction. In this case, the LM guide 250 may be coupled so that an LM rail is fixed to a frame constituting the fin transfer unit 200, LM blocks are fixed to the first fin tray 210 and the second fin tray 220, respectively, and the LM rail and the LM blocks are slidable in the width direction. In addition, the first fin tray 210 may be connected to the first tray driving means 230 to linearly move the first fin tray 210 in the width direction by the operation of the first tray driving means 230. Similarly, the second fin tray 220 may be connected to the second tray driving means 240 to linearly move the second fin tray 220 in the width direction by the operation of the second tray driving means 240. As a result, the first fin tray 210 and the second fin tray 220 may be moved to an intermediate point between the first fin tray 210 and the second fin tray 220 in the width direction, which is a position facing each other, and may be operated to be returned to original positions. In this case, each of the first tray driving means 230 and the second tray driving means 240 may include a driving motor, a ball screw, a bearing, a coupling, and the like. The ball screw connected to the driving motor converts a rotational motion into a linear motion so that the fin trays may move in the width direction or the positions of the fin trays may be fixed in a state in which the fin trays are moved. In addition, the driving motor may allow the fins to be stored in the fin seating grooves formed in the fin trays while the fin trays are moved step by step by using a step motor or a servo motor.

The fin discharge unit 300 serves to push and discharge the fins stored in the fin trays. In addition, the fin discharge unit 300 may include a pusher 310 and a pusher driving means 320, and may further include a frame extending in the length direction. In this case, the frame is disposed on a line intersecting the width direction, which is a line connecting the first fin tray 210 and the second fin tray 220 of the fin transfer unit 200, and may be disposed at an intermediate point of the first fin tray 210 and the second fin tray 220, and may be configured so that the pusher 310 is linearly moved in the length direction along the frame by the operation of the pusher driving means 320. In addition, the pusher 310 and the driving means 320 may be integrally formed, the pusher 310 may be coupled to the frame by the LM guide, and the pusher 310 may be coupled to a vertical movement means such as a cylinder and vertically moved in a height direction. In addition, the pusher 310 is formed in the form of a comb corresponding to the fin seating grooves formed in the fin trays and may push and discharge the fins stored in the fin trays at one time in the length direction. Here, the pusher 310 may be configured to move from a position beyond a left end of the fin transfer unit 200 in the length direction to a range beyond a right end of the guide part 400. In addition, the pusher driving means 320 may include a driving motor, a ball screw, a bearing, a coupling, and the like as described in the fin transfer unit 200. The ball screw connected to the driving motor converts a rotational motion into a linear motion so that the pusher 310 may move in the length direction or the position of the pusher 310 may be fixed in a state in which the pusher 310 is moved.

The guide part 400 serves to guide the fins so that the fins discharged from the fin transfer unit 200 are transferred and inserted between the tubes disposed to be apart from each other in advance, which is a next process. The guide part 400 may include a guide tray 410 and a guide tray driving means 420. In this case, a fin guide groove may be formed to be concave in an upper surface of the guide tray 410, and may be continuously formed from a left side of the guide tray 410 in the length direction to a right side thereof. In addition, the fin guide groove of the guide tray 410 may be formed to correspond to the fin seating grooves formed in the first fin tray 210 and the second fin tray 220. In addition, the guide tray 410 is also coupled to the LM guide and is linearly movable along the length direction. The guide tray driving means 420 may be connected to the guide tray 410 to move the guide tray 410 in the length direction. In this case, the guide tray driving means 420 may similarly include a driving motor, a ball screw, a bearing, a coupling, and the like. The ball screw connected to the driving motor converts a rotational motion into a linear motion so that the guide tray may move in the length direction or the position of the guide tray may be fixed in a state in which the guide tray is moved.

Hereinafter, a heat exchanger automatic assembly method using the heat exchanger automatic assembly apparatus according to the present invention as described above will be described.

Figure 7:
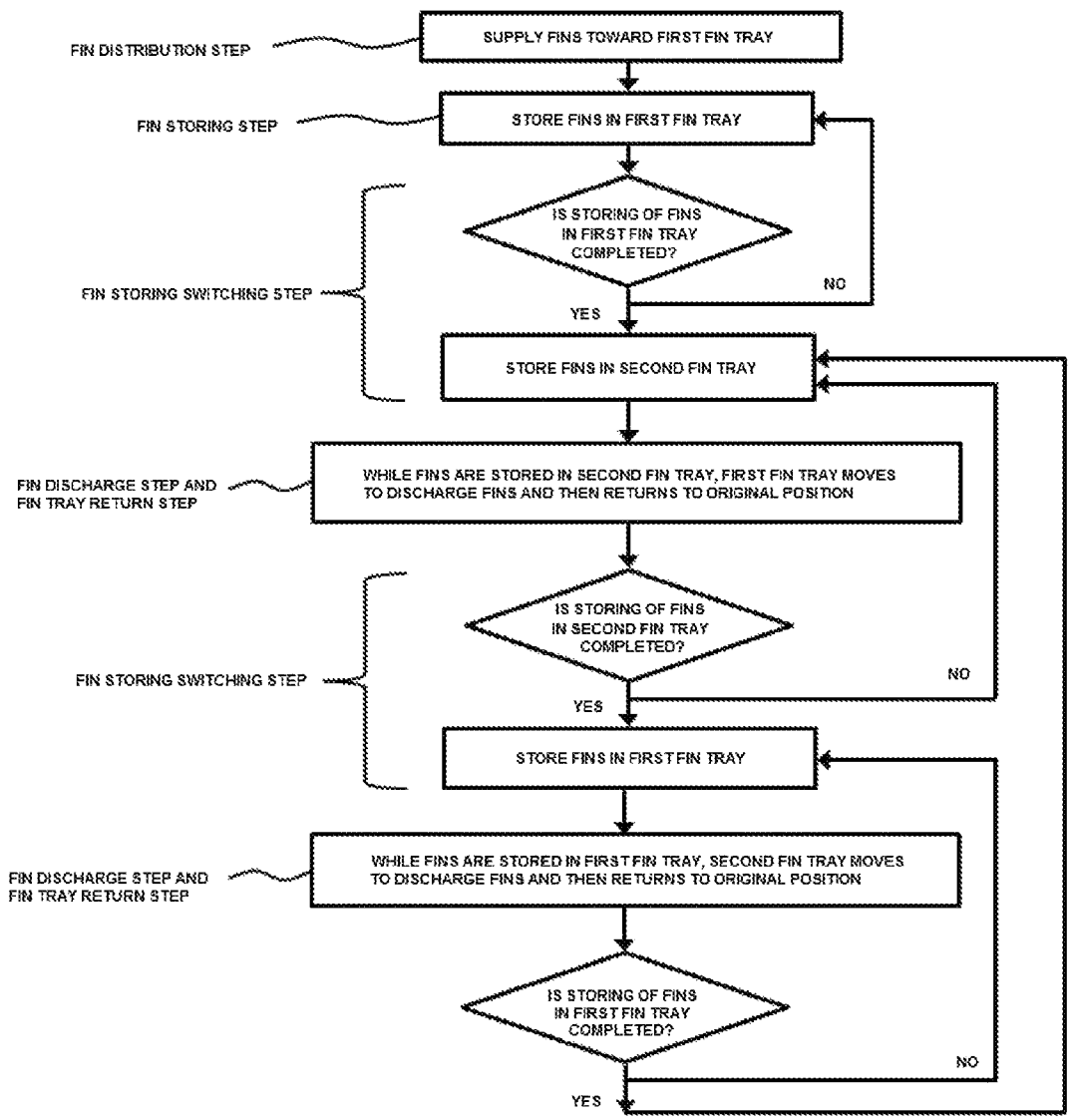
FIG. 7 is a flowchart illustrating a heat exchanger automatic assembly method according to an embodiment of the present invention.

FIG. 7 is a flowchart illustrating a heat exchanger automatic assembly method according to an embodiment of the present invention.

Referring to FIG. 7, a heat exchanger automatic assembly method according to an embodiment of the present invention may include a fin distribution step, a fin storing step, a fin storing switching step, a fin discharge step, a fin tray return step. After the fin tray return step, the fin storing switching step, the fin discharge step, and the fin tray return step may be repeatedly performed.

Figure 8:
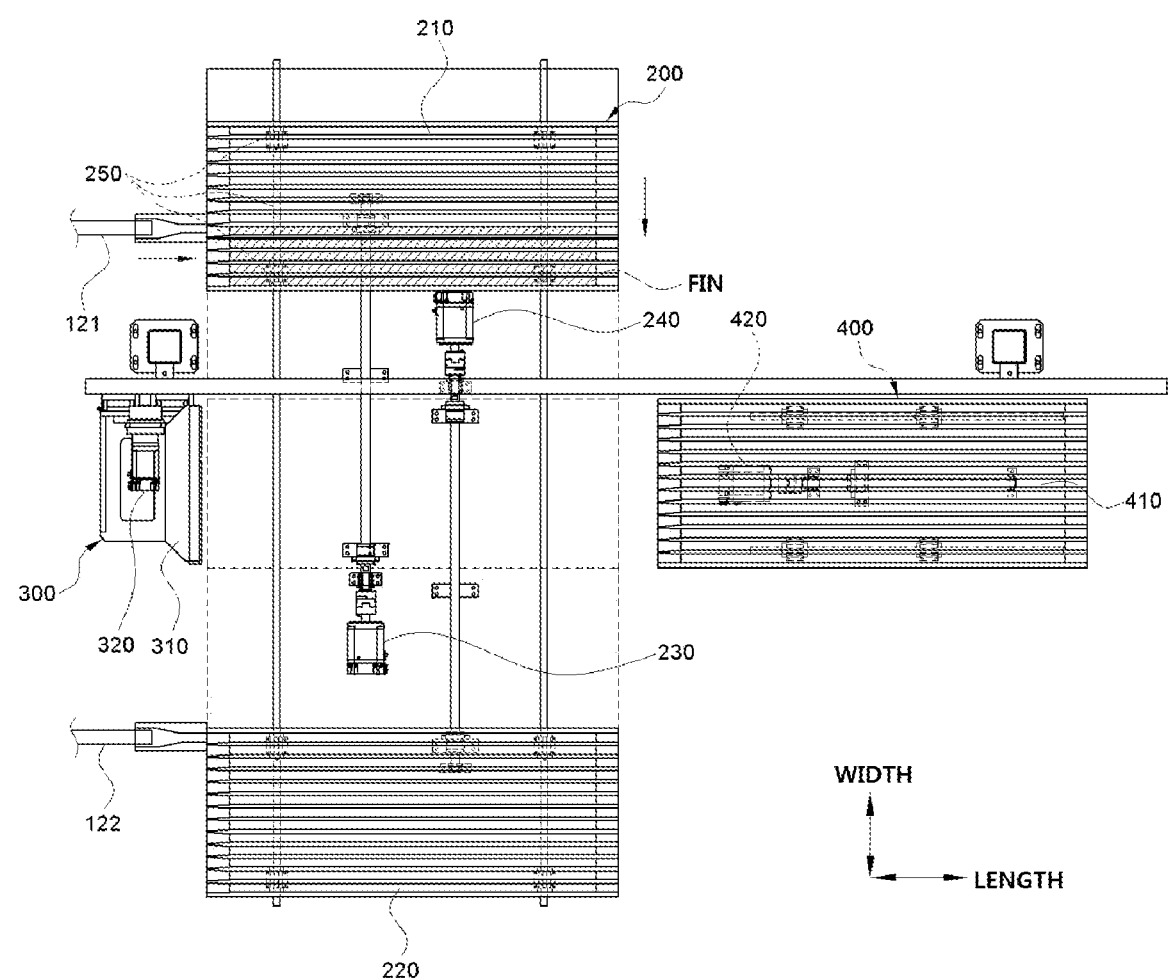
FIG. 8 is a top plan view illustrating a state in which fins are stored in a first fin tray in the automatic heat exchanger assembly apparatus according to an embodiment of the present invention.

FIG. 8 is a top plan view illustrating a state in which fins are stored in a first fin tray in the automatic heat exchanger assembly apparatus according to an embodiment of the present invention.

Referring to FIG. 8, first, in the fin distribution step, the first fin tray 210 and the second fin tray 220 are disposed to be spaced apart from each other in the width direction at the rear and the front of the fin transfer unit 200. The first fin tray 210 may be disposed at a standby position close to a fin discharge point, which is the right end of the first fin distribution line 121 of the fin distribution unit 100, and the second fin tray 220 may be disposed at a standby position close to a fin discharge point, which is the right end of the second fin distribution line 122. In this state, the fins may be continuously supplied to the fin distribution unit 100 at a specific time interval along the first fin distribution line 121 to store the fins in the first fin tray 210.

In addition, in the fin storing step, the fins are stored while the first fin tray 210 is moved, and the fins are stored in the first fin tray 210 while the first fin tray 210 moves forward by one step in the width direction by a distance corresponding to one pitch, which is a distance between neighboring fin seating grooves. In this case, the fin is not supplied to the second fin distribution line 122.

Figure 9:
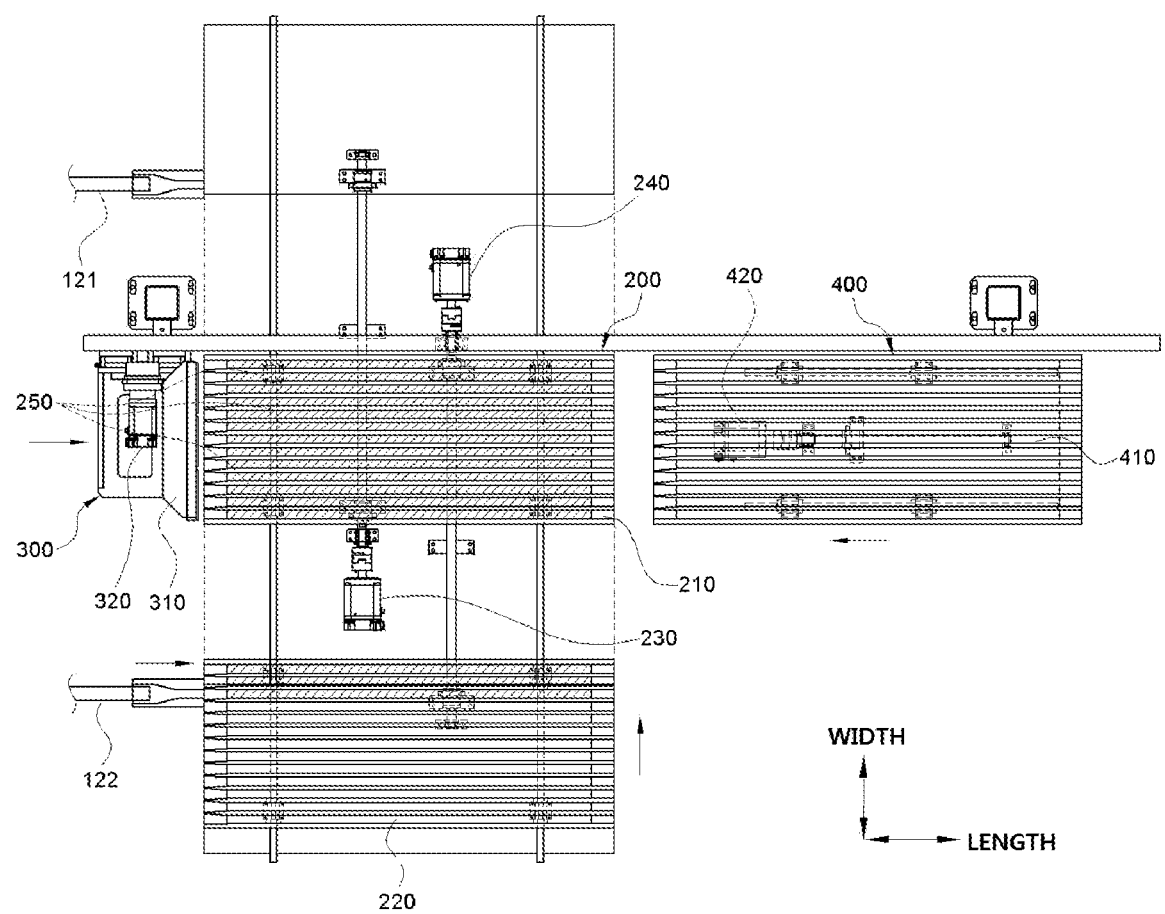
FIG. 9 is a top plan view illustrating a state in which the fins are moved to an intermediate point after the storing of the fins in the first fin tray is completed, and the fins are discharged at one time by a pusher in the automatic heat exchanger assembly apparatus according to an embodiment of the present invention.

FIG. 9 is a top plan view illustrating a state in which the fins are moved to an intermediate point after the storing of the fins in the first fin tray is completed, and the fins are discharged at one time by a pusher in the automatic heat exchanger assembly apparatus according to an embodiment of the present invention.

Referring to FIG. 9, thereafter, in the fin storing switching step, when the storing of a predetermined number of fins in the first fin tray 210 is completed, the redirection apparatus 130 switches a fin supply direction in the fin distribution unit 100 and the fins are continuously supplied at a specific time interval along the second fin distribution line 122 and are stored in the second fin tray 220. That is, the fins may be continuously supplied through the redirection without stopping the introduction of the fin into the fin distribution unit 100. Similarly, the fins are stored in the second fin tray 220 while the second fin tray 220 moves backward by one step in the width direction.

Thereafter, the fin discharge step is a step of moving the fin tray in which the storing of the fins is completed to a predetermined position and then discharging the stored fins to the predetermined position. The fin discharge step may further include a guide tray reciprocating step of, by the guide tray, transferring the fins stored in the fin tray to the next process while reciprocating between the fin tray where the storing of the fins is completed and the next process. Specifically, the first fin tray 210 where the storing of the fins is completed is moved forward in the width direction and is moved to and stopped at a point where the pusher 310 and the guide tray 410 are disposed in the width direction, which is an intermediate point between the standby position of the first fin tray 210 and the standby position of the second fin tray 220. Thereafter, the guide tray 410 is moved to the left in the length direction so that the left end of the guide tray 410 is in contact with the right end of the first fin tray 210. Thereafter, the pusher 310 is moved downward in the height direction and is then moved to the right in the length direction in this state to push the fins stored in the first fin tray 210 toward the guide tray 410 at one time, and as a result, the fins are discharged from the first fin tray 210. In addition, in the case in which all the fins are moved toward the guide tray 410, after the pusher 310 and guide tray 410 move to the right in the length direction together to push the fins to the next process, the pusher 310 and guide tray 410 may be returned to the original positions.

In the fin tray return step, after the fins are completely moved from the first fin tray 210 to the guide tray 410, the empty first fin tray 210 is moved to the rear side in the width direction to return to an original standby position. In addition, while the first fin tray 210 is out of the standby position, the fins are stored in the second fin tray 220.

Figure 10:
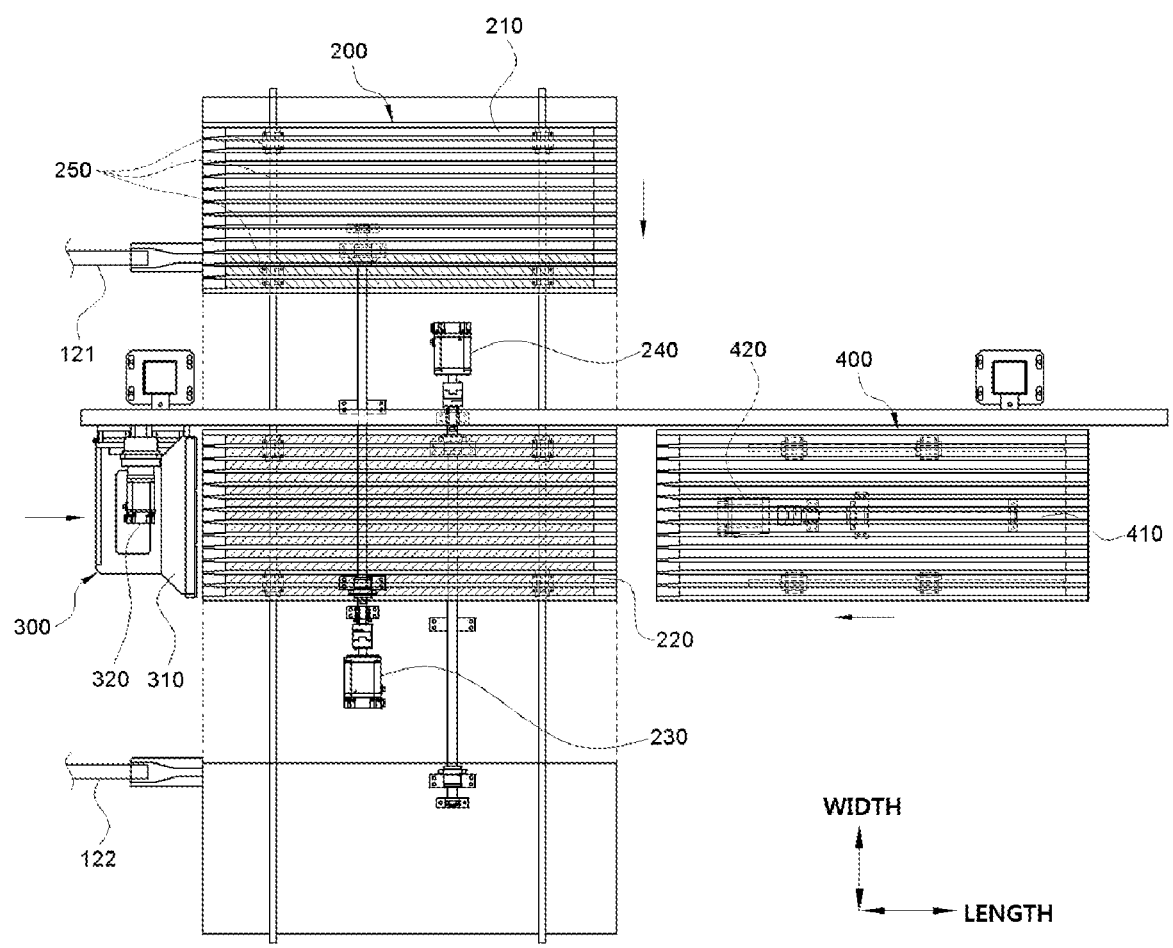
FIG. 10 is a top plan view illustrating a state in which the discharge of the fins stored in the first fin tray in FIG. 9 is completed, the first fin tray is returned to an original position to store the fins again, a second fin tray where the storing of the fins is completed is moved to the intermediate point, and the fins are discharged at one time by the pusher.

FIG. 10 is a top plan view illustrating a state in which the discharge of the fins stored in the first fin tray in FIG. 9 is completed, the first fin tray is returned to an original position to store the fins again, a second fin tray where the storing of the fins is completed is moved to the intermediate point, and the fins are discharged at one time by the pusher.

Referring to FIG. 10, when the storing of a predetermined number of fins in the second fin tray 220 is completed, the redirection apparatus 130 switches a fin supply direction in the fin distribution unit 100 and the fins are continuously supplied at a specific time interval along the first fin distribution line 121 and are stored in the first fin tray 220. In this case as well, the fins may be continuously supplied through the redirection without stopping the introduction of the fin into the fin distribution unit 100. In addition, the fins are stored in the first fin tray 210 while the first fin tray 210 moves forward by one step in the width direction. In this case, the second fin tray 220 where the storing of the fins is completed is moved backward in the width direction and is moved and stopped to a point where the pusher 310 is disposed in the width direction, which is an intermediate point between the standby position of the first fin tray 210 and the standby position of the second fin tray 220. Thereafter, the guide tray 410 is moved to the left in the length direction so that the left end of the guide tray 410 is in contact with the right end of the second fin tray 220. Thereafter, the pusher 310 is moved downward in the height direction and is then moved to the right in the length direction to push the fins stored in the second fin tray 220 toward the guide tray 410 at one time. In addition, in the case in which all the fins are moved toward the guide tray 410, the pusher 310 and guide tray 410 move to the right in the length direction together to push the fins to the next process.

Here, after the fins are completely moved from the second fin tray 220 to the guide tray 410, the empty second fin tray 220 is moved to the front side in the width direction to return to an original standby position. In addition, while the second fin tray 220 is out of the standby position, the fins are stored in the first fin tray 210.

Thereafter, by repeatedly performing the processes described with reference to FIGS. 9 and 10, the operation may be continued by transferring a plurality of fins at one time to a process of assembling the tubes and the fins. In this case, referring to the flowchart of FIG. 7, until the storing of a predetermined number of fins in the second fin tray 220 is completed by performing the fin storing switching step for the second fin tray 220, the fin discharge step and the fin tray return step may be performed for the first fin tray 210 and completed. Thereafter, similarly, until the storing of a predetermined number of fins in the first fin tray 210 is completed by performing the fin storing switching step for the first fin tray 210, the fin discharge step and the fin tray return step may be performed for the second fin tray 220 and completed.

As a result, according to the present invention, the fins may be continuously supplied to the fin trays without stopping the supply of the fins to two or more fin trays and the plurality of fins may be discharged at one time to allow the fins to be interposed between the tubes arranged to be spaced apart from each other, thereby reducing the supply time of the fin to improve productivity, and reducing the discarded fins to reduce the manufacturing cost.

Figure 11:
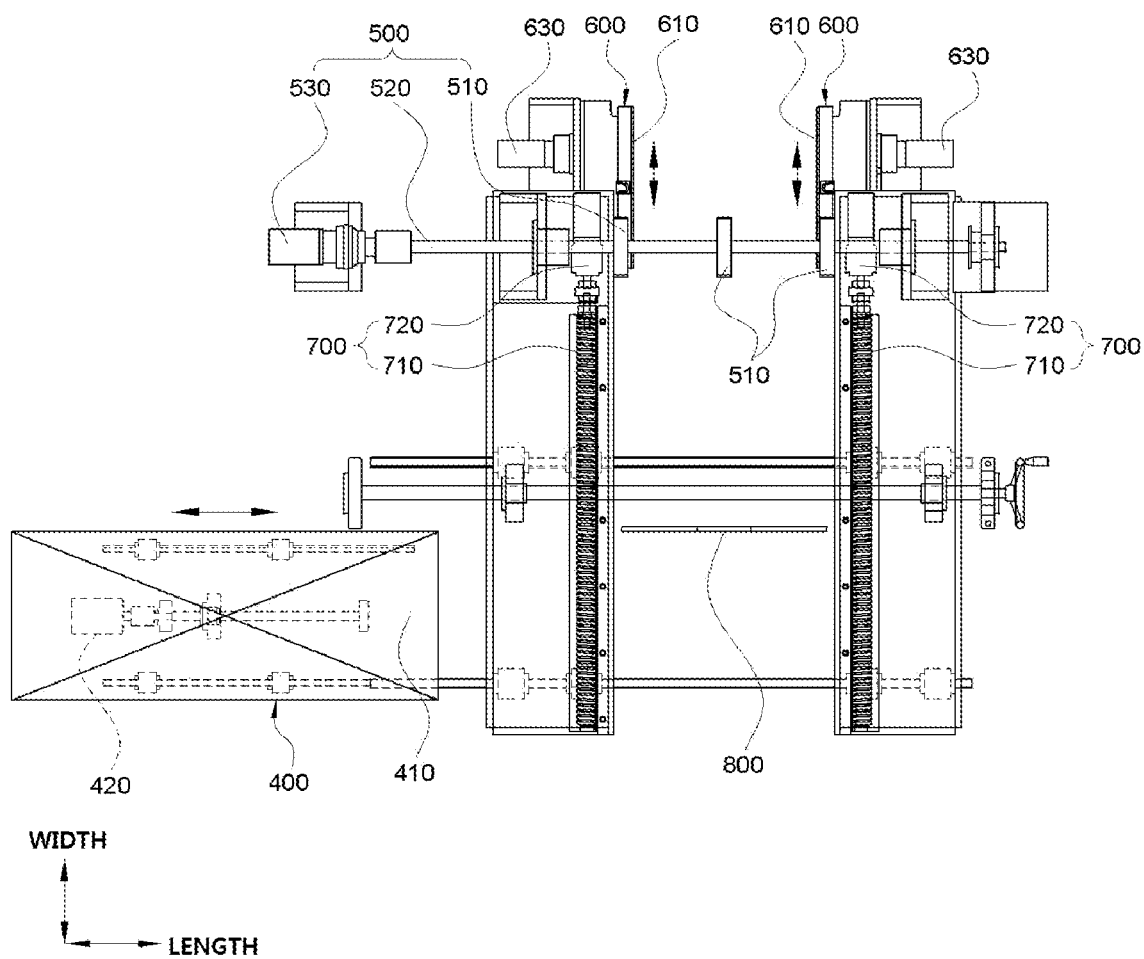
FIGS. 11 and 12 are a top plan view and a front view illustrating a heat exchanger automatic assembly apparatus according to another embodiment of the present invention.
Figure 12:
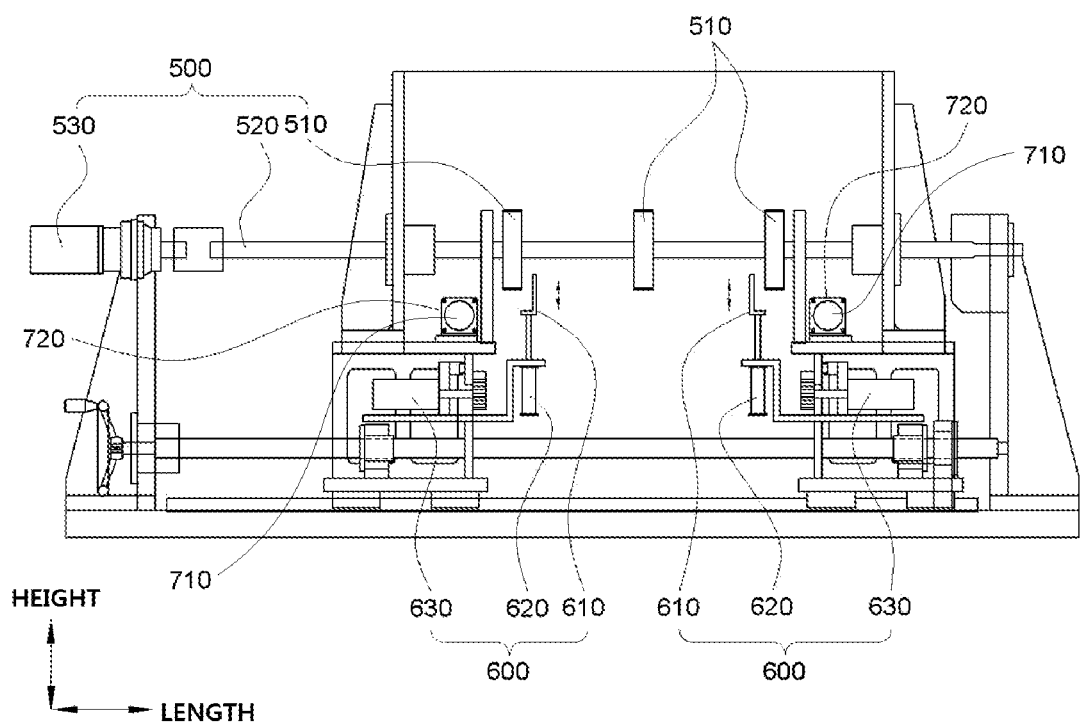
Figure 13:
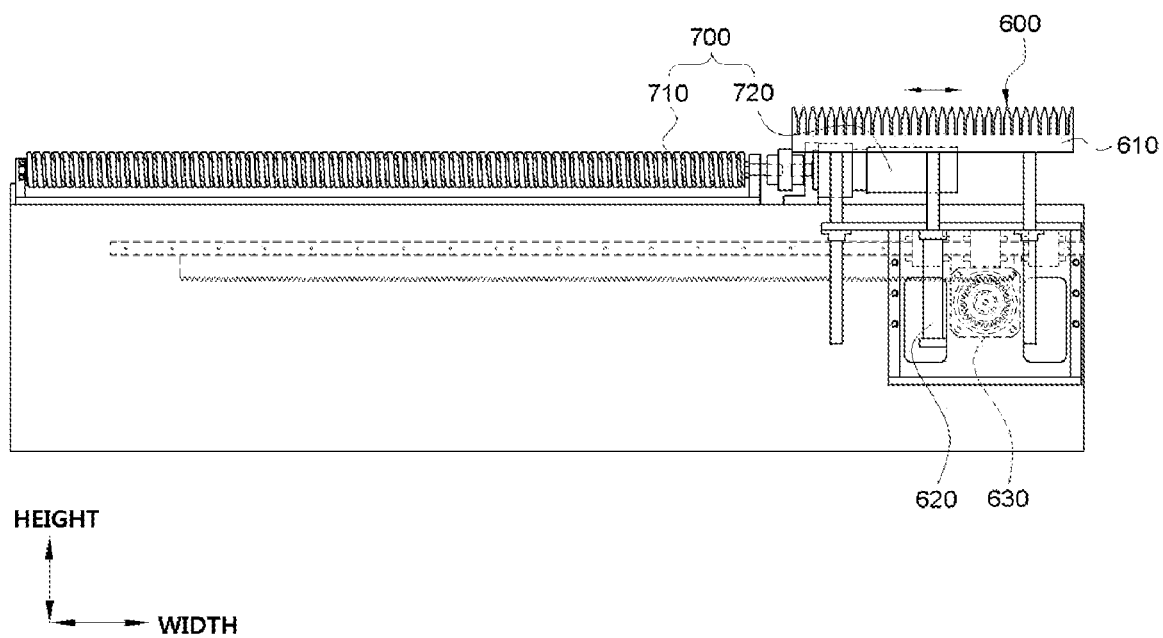
FIG. 13 is a right side view illustrating a feeding screw and a tube shuttle of the heat exchanger automatic assembly apparatus according to another embodiment of the present invention.

FIGS. 11 and 12 are a top plan view and a front view illustrating a heat exchanger automatic assembly apparatus according to another embodiment of the present invention and FIG. 13 is a right side view illustrating a feeding screw and a tube shuttle of the heat exchanger automatic assembly apparatus according to another embodiment of the present invention.

As illustrated, a heat exchanger automatic assembly apparatus according to an embodiment of the present invention may include a tube supply unit 500, a tube transfer unit 600, a tube and fin transfer unit 700, a fin supply part, and a tube and fin discharge unit 800.

The tube supply unit 500 serves to supply the tubes to the tube transfer unit 600 one by one at a specific cycle. The tube supply unit 500 may include a single tube supply apparatus 510, a rotation shaft 520, and a driving means 530. A plurality of single tube supply apparatuses 510 may be coupled to the rotation shaft 520 and may be disposed to be spaced apart from each other along the rotation shaft 520. In addition, the single tube supply apparatus 510 is formed in the form of a disc, has a tube seating portion formed to be concave in an outer circumference surface of the single tube supply apparatus 510, and has a catching protrusion formed at the rear of the tube seating portion in a rotational direction of the single tube supply apparatus 510. As a result, the tubes may be rotated one by one by the rotation of the single tube supply apparatus 510 to fall down. In this case, the single tube supply apparatus 510 may have a plurality of tube seating portions and catching protrusions formed in a pair, which may be spaced apart from each other at intervals of 180 degrees, for example. In addition, the rotation shaft 520 may be coupled to the frame so as to be rotatable by a bearing or the like, the driving means 530 may be coupled to one end of the rotation shaft 520 as the coupling, and the driving means 530 may be coupled and fixed to the frame. Although not illustrated herein, an upper side of the single tube supply apparatus 510 in the height direction is provided with a tube dispenser in which the tubes are stacked in the height direction. Therefore, when one tube falls while the single tube supply apparatus 510 is rotated at 180 degrees, the tube dispenser may cause the next tube to seat on the tube seating portion of the single tube supply apparatus 510 again. As a result, the tube supply unit 500 may periodically repeat the rotation of the single tube supply apparatus 510 so that the tubes may be stored in the tube transfer unit 600 at regular time intervals.

The tube transfer unit 600 serves to store the tubes supplied from the tube supply unit 500 in the form arranged to be spaced apart and supply the tubes to the tube and fin transfer unit 700. The tube transfer unit 600 may include a tube shuttle 610, a shuttle vertical movement means 620 and a shuttle driving means 630, and the tube transfer units 600 are formed of a pair and may be disposed to be bilaterally symmetrical with respect to the center in the length direction. A tube seating groove is formed to be concave downward from an upper surface of the tube shuttle 610, so that the tube may be stored in the tube seating groove, and a plurality of tube seating grooves may be formed to be spaced apart in the width direction to have a hair comb shape. In addition, in a state in which the tube is stored in the tube shuttle 610, the tube shuttle 610 may be disposed at a height lower than that of the rotation shaft 520 of the tube supply unit 500, and the tube shuttle 610 may be disposed at a height at which an upper side partially overlaps the single tube supply apparatus 510 in the height direction. In addition, the tube shuttle 610 is coupled to the shuttle vertical movement means 620, so that the tube shuttle 610 may be vertically moved by the operation of the shuttle vertical movement means 620. As an example, the shuttle vertical movement means 620 may be a pneumatic cylinder and may be formed in various ways. The shuttle driving means 630 is coupled to the frame by the LM guide, so that the shuttle driving means 630 may be linearly moved forward and backward in the width direction by the operation of the shuttle driving means 630. In this case, a base plate is coupled to the shuttle driving means 630 and the shuttle vertical movement means 620 is coupled to the base plate, so that the tube shuttle 610, the shuttle vertical movement means 620, and the shuttle driving means 630 may be integrally formed. As a result, when the shuttle driving means 630 is operated, the tube shuttle 610, the shuttle vertical movement means 620, and the shuttle driving means 630 may be moved together forward and backward in the width direction. As an example, the shuttle driving means 630 may be a motor, and a rack gear may be coupled to a driving shaft of the motor, a rack may be fixed to the frame, and the rack and the rack gear may be engaged and coupled to each other.

The tube and fin transfer unit 700 serves to be supplied with the tubes from the tube transfer unit 600 and supplied with the fins from the guide part 400 to assembly the plurality of tubes and the plurality of fins at one time, and transfer a tube and fin stacking body in which the assembled tubes and fins are arranged in an alternatively stacked form. The tube and fin transfer unit 700 may include a feeding screw 710 and a screw driving means 720, and the tube fin and transfer units 700 are formed of a pair and may be disposed to be bilaterally symmetrical with respect to the center in the length direction. The feeding screw 710 may be a screw in which a spiral blade protrudes from a rotation shaft formed along the width direction. Both end portions of the feeding screw 710 may be coupled to the frame by a bearing or the like so as to be rotatable. The screw driving means 720 may be coupled and fixed to the frame. As an example, the screw driving means 720 may be formed as a motor and a driving shaft thereof may be coupled to the feeding screw 710 by the coupling. As a result, the feeding screw 710 may be rotated by the operation of the screw driving means 720. Here, the feeding screw 710 is formed such that a pitch formed by the valley portions, which are concave portions between neighboring blades, is equal to the pitch of the neighboring tube seating grooves formed in the tube shuttle 610. As a result, the tubes transferred through the tube shuttle 610 may be inserted into the valley portions of the feeding screw 710. In addition, the tubes are inserted between a pair of screws when seated in the feeding screw 710, such that a lower end of the tube may be supported by a support fixed to the frame, and both ends of the tube may be inserted into the valley portions of the feeding screw 710 in the length direction.

The fin supply part serves to supply a plurality of fins at one time to the tube transfer unit 700. The fin supply part may be formed in various ways and may be configured as described in the heat exchanger automatic assembly apparatus according to an embodiment of the present invention described above.

The tube and fin discharge unit 800 serves to move the tube and fin stacking body in which the plurality of tubes and the plurality of fins are assembled in the tube and fin transfer unit 700 to the next process. In this case, the tube and fin discharge unit may separate the tube and fin stacking body by one core amount and transfer the separated tube and fin stacking body to a compression process of compressing the tube and fin stacking body in a stacking direction, which is the next process.

In addition, a plurality of single tube supply apparatuses 510 of the tube supply unit 500 may be provided to be spaced apart from each other in the length direction, a pair of tube transfer units 600 may be provided to be spaced apart from each other in the length direction, and the tube and fin transfer unit 700 may have the screw driving means 720 connected to each feeding screw 710 one by one. In this case, the single tube supply apparatus 510, the tube transfer unit 600, the feeding screw 710, and the screw driving means 720 may be integrally formed in one set, one by one, and a gap between two sets spaced apart in the length direction may be adjustable by a gap adjusting apparatus. As a result, the gap may be adjusted and used according to a length of the tube.

Hereinafter, a heat exchanger automatic assembly method using the heat exchanger automatic assembly apparatus according to another embodiment of the present invention as described above will be described.

Figure 14:
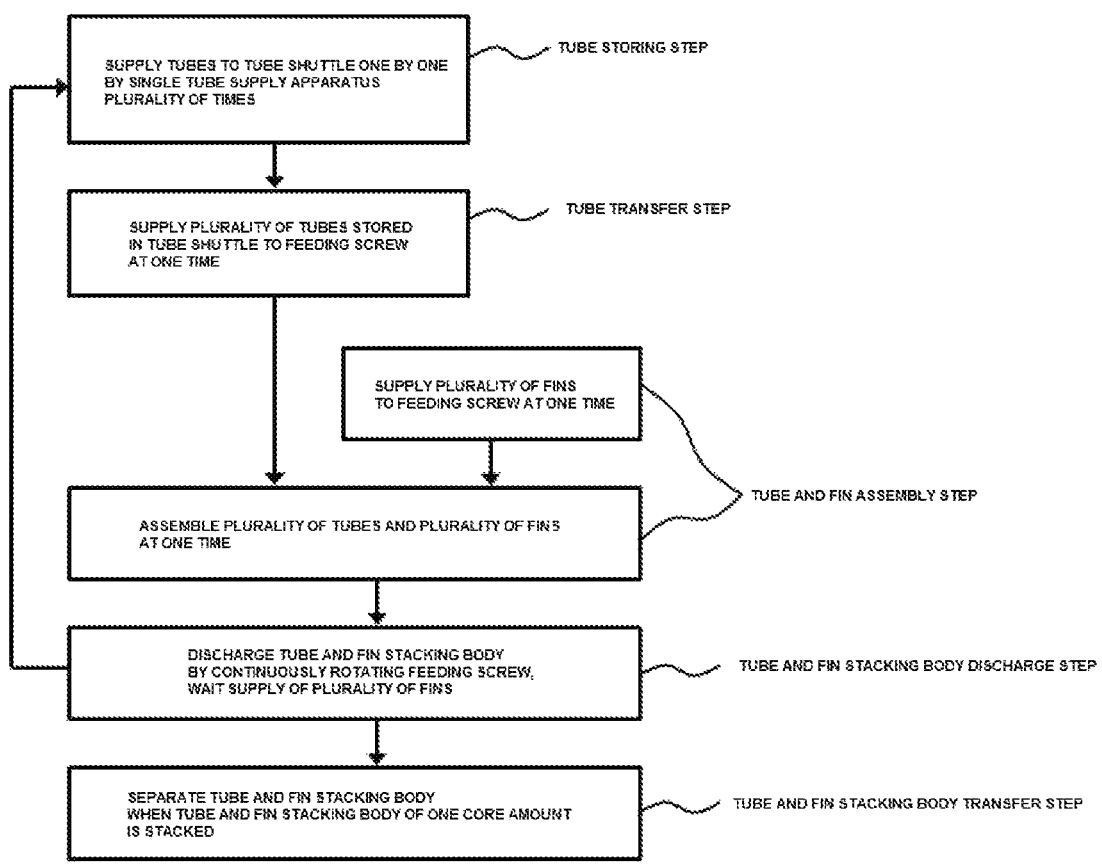
FIG. 14 is a flowchart illustrating a heat exchanger automatic assembly method according to another embodiment of the present invention.

FIG. 14 is a flowchart illustrating a heat exchanger automatic assembly method according to another embodiment of the present invention.

Referring to FIG. 14, a heat exchanger automatic assembly method according to another embodiment of the present invention includes a tube storing step, a tube transfer step, a tube and fin assembly step, a tube and fin stacking body discharge step, and a tube and fin stacking body transfer step, wherein a tube and fin stacking body of one core amount constituting a heat exchanger may be manufactured. In addition, the tube storing step, the tube transfer step, the tube and fin assembly step, the tube and fin stacking body discharge step, and the tube and fin stacking body transfer step may be repeatedly performed, such that the tube and fin stacking body of one core amount may be continuously manufactured at a specific cycle.

Figure 15:
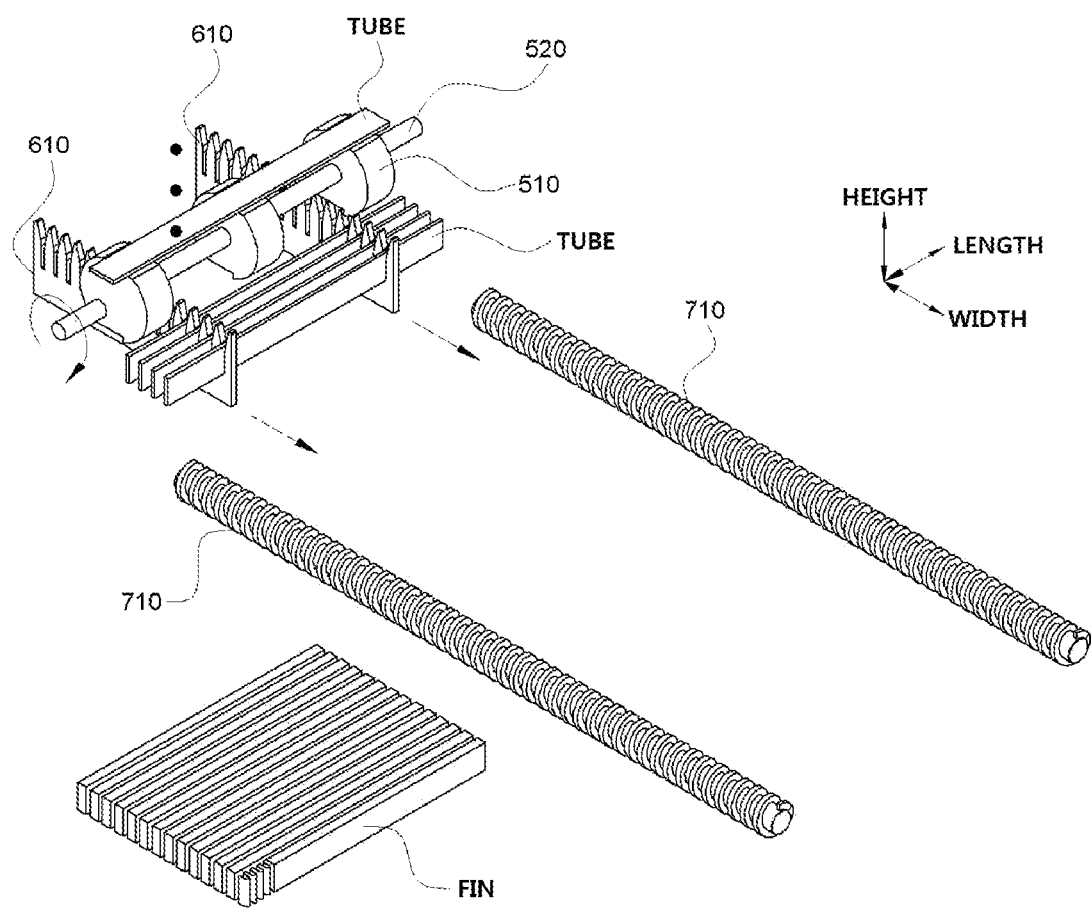
FIG. 15 is a perspective view illustrating a state in which tubes are stored in the tube shuttle in the heat exchanger automatic assembly apparatus according to another embodiment of the present invention.

FIG. 15 is a perspective view illustrating a state in which tubes are stored in the tube shuttle in the heat exchanger automatic assembly apparatus according to another embodiment of the present invention.

Referring to FIG. 15, first, in the tube storing step, in a state in which the tube shuttle 610 is disposed adjacent to a lower portion of the single tube supply apparatus 510 of the tube supply unit 500, the tubes fall down while being rotated one by one by the rotation of the single tube supply apparatus 510 and are seated in the tube seating grooves of the tube shuttle 610, and the tube shuttle 610 moves forward by one step in the width direction and the single tube supply apparatus 510 rotates, such that the tubes may be stored in the tube seating grooves of the tube shuttle 610.

Figure 16:
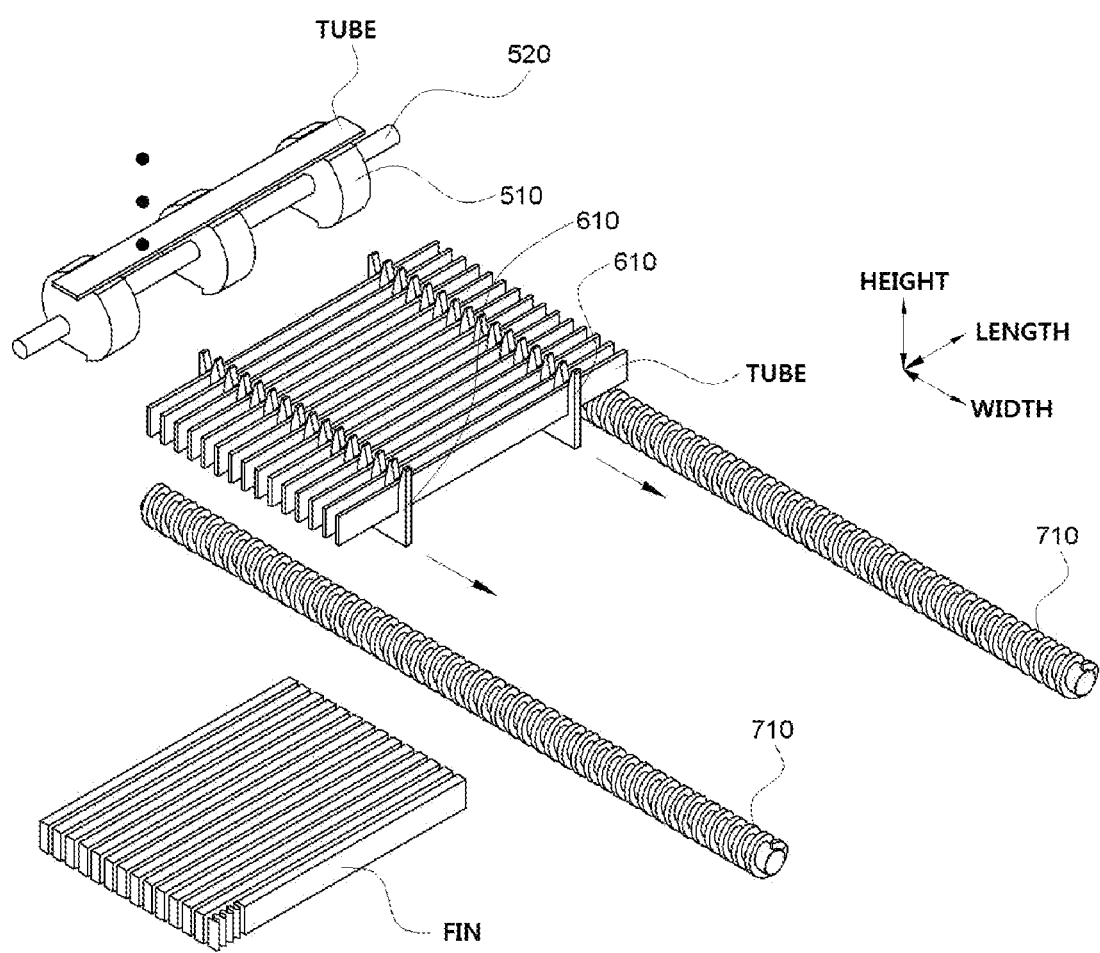
FIG. 16 is a perspective view illustrating a state in which the storing of the tubes in the tube shuttle is completed in the heat exchanger automatic assembly apparatus according to another embodiment of the present invention.
Figure 17:
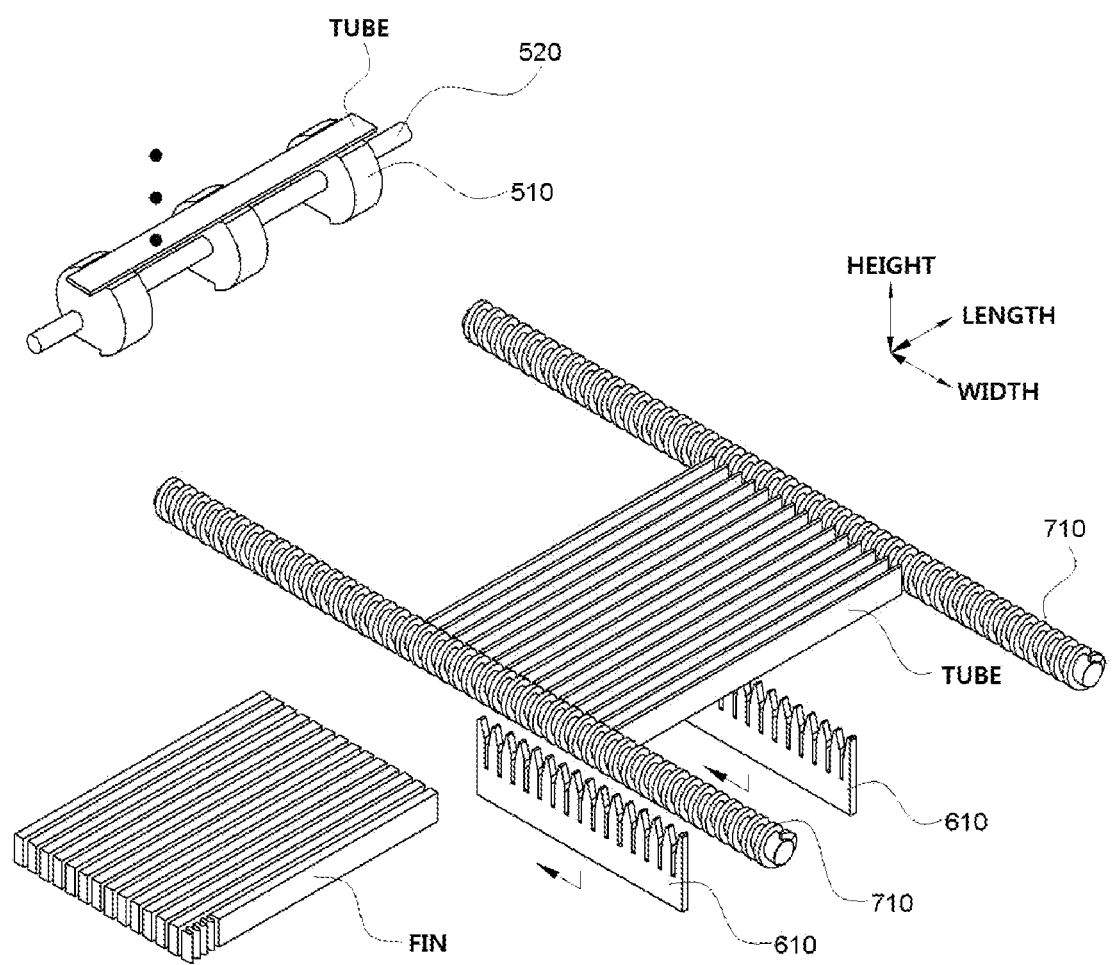
FIG. 17 is a perspective view illustrating a state in which the tube shuttle in which the storing of the tubes is completed is moved forward up to a designated position and then descends, and a plurality of tubes are supplied to a feeding screw at one time in the heat exchanger automatic assembly apparatus according to another embodiment of the present invention.

FIG. 16 is a perspective view illustrating a state in which the storing of the tubes in the tube shuttle is completed in the heat exchanger automatic assembly apparatus according to another embodiment of the present invention and FIG. 17 is a perspective view illustrating a state in which the tube shuttle in which the storing of the tubes is completed is moved forward up to a designated position and then descends, and a plurality of tubes are supplied to a feeding screw at one time in the heat exchanger automatic assembly apparatus according to another embodiment of the present invention.

Referring to FIGS. 16 and 17, in the tube transfer step, after the storing of the tubes in the tube shuttle 610 is completed, the tube shuttle 610 is moved forward in the width direction up to a predetermined position and then descends, such that the tubes are seated between the feeding screws 710 and both ends of the tubes are inserted into the valley portions between the blades of the feeding screws 710 and are caught on the valley portions. In this case, a plurality of fins are waiting at the left side in the length direction at a portion corresponding to the position in the width direction where the tubes are seated in the feeding screw 710. As an example, the plurality of fins may be waiting in a state stored in the guide part. In addition, the descended tube shuttle 610 moves to the rear in the width direction and then ascends to return to the lower side of the single tube supply apparatus 510 which is a position where the tubes are stored.

Figure 18:
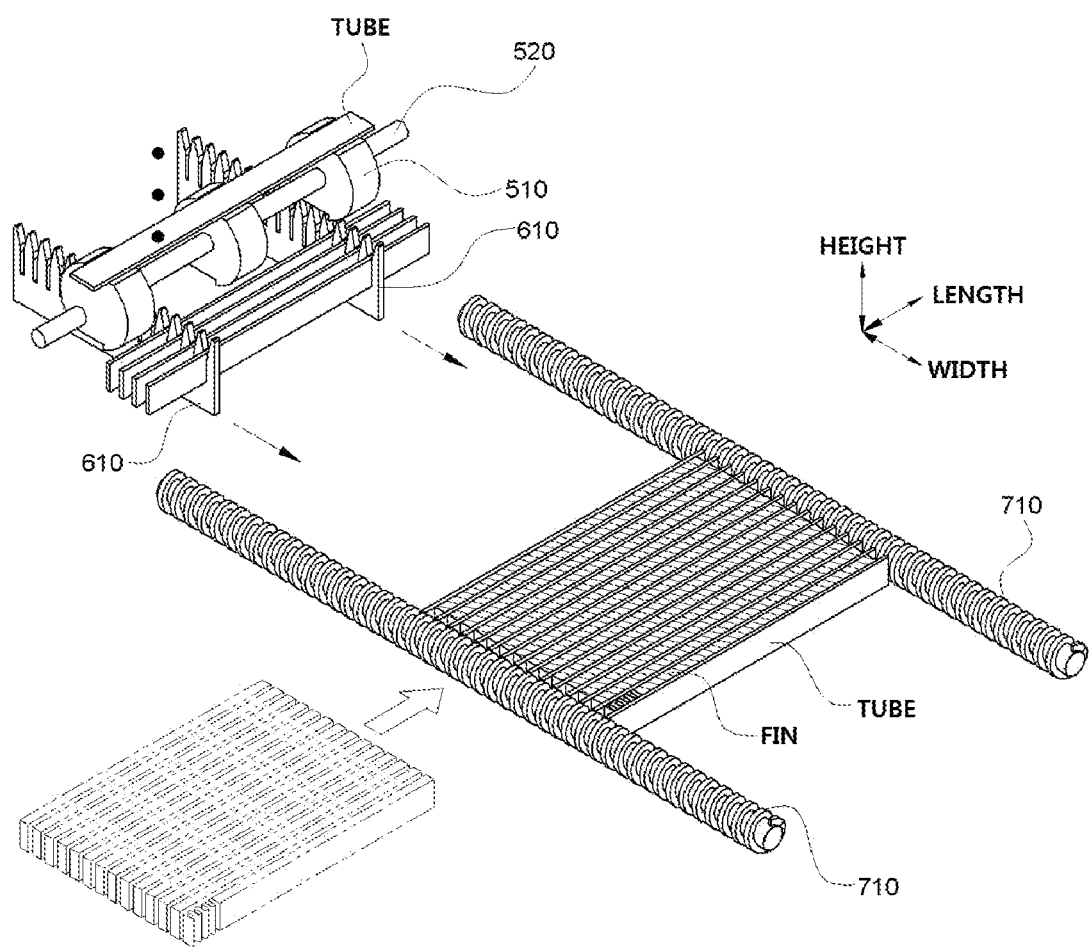
FIG. 18 is a perspective view illustrating a state in which a plurality of fins are supplied between the tubes supplied onto the feeding screw at one time and a tube and fin stacking body is assembled in a form in which the plurality of tubes and the plurality of fins are alternatively stacked in the heat exchanger automatic assembly apparatus according to another embodiment of the present invention.

FIG. 18 is a perspective view illustrating a state in which a plurality of fins are supplied between the tubes supplied onto the feeding screw at one time and a tube and fin stacking body is assembled in a form in which the plurality of tubes and the plurality of fins are alternatively stacked in the heat exchanger automatic assembly apparatus according to another embodiment of the present invention.

Referring to FIG. 18, in the tube and fin assembly step, the fins which are waiting in advance are inserted between the tubes inserted and seated between the pair of feeding screws. As a result, when two tubes and one fin between the two tubes are referred to as one set, a plurality of sets may be assembled on the feeding screw 710 at one time to manufacture the tube and fin stacking body. In addition, in a state where the plurality of fins are stored in the guide part of the fin supply part, the guide part may move to a position close to the feeding screw to transfer the fins toward the tube. The fins may be inserted between the tubes while passing above the feeding screw 710 and descending slightly downward. In this case, for the tube shuttle 610 returned to the original position, a process of storing the tube may be performed as in the tube storing step.

Figure 19:
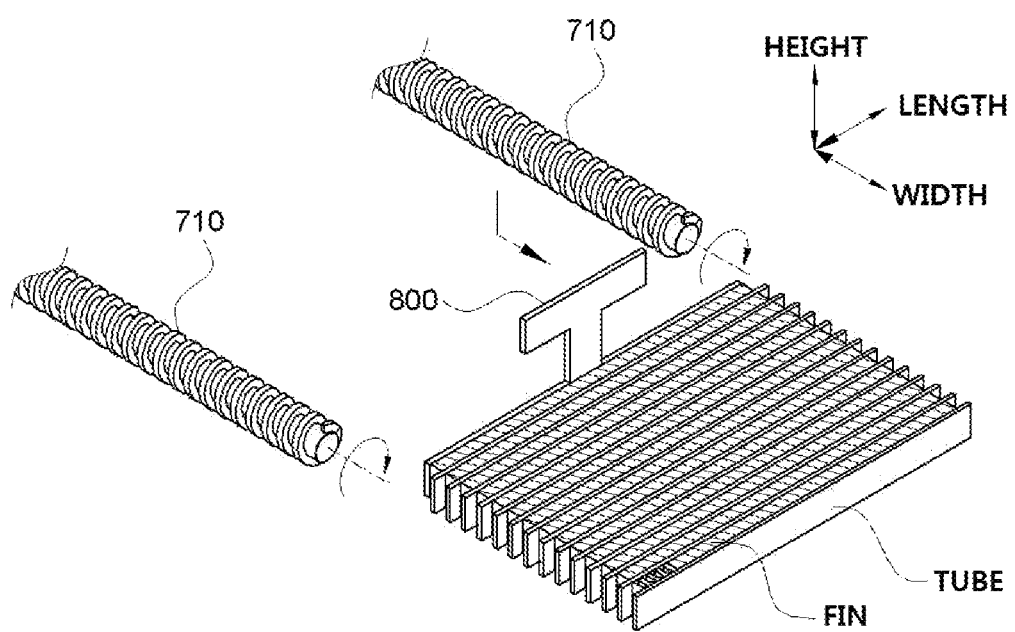
FIG. 19 is a perspective view illustrating a state in which the tube and fin stacking body is discharged forward by rotating the feeding screw and then the tube and fin stacking body is transferred to a next process using dummy tubes in the heat exchanger automatic assembly apparatus according to another embodiment of the present invention.

FIG. 19 is a perspective view illustrating a state in which the tube and fin stacking body is discharged forward by rotating the feeding screw and then the tube and fin stacking body is transferred to a next process using dummy tubes in the heat exchanger automatic assembly apparatus according to another embodiment of the present invention.

Referring to FIG. 19, in the tube and fin stacking discharge step, the feeding screws 710 may be rotated to discharge the tube and fin stacking body forward in the width direction.

In addition, in the tube and fin stacking body transfer step, the tube and fin discharge unit 800 descends and then moves forward in the width direction, such that the tube and fin stacking body may be transferred to the next process. In this case, the tube and fin stacking body may be divided into a tube and fin stacking body of one core amount by the tube and fin discharge unit 800 and transferred to the next process. In addition, although not illustrated, a support part having a plate shape is provided at a front side in the width direction of the tube and fin stacking body opposite to the tube and fin discharge unit 800 in the width direction. Therefore, the tube and fin stacking body may also be transferred in a compressed state in a stacked direction by the tube and fin discharge unit 800 and the support part.

In addition, the tube storing step, the tube transfer step, the tube and fin assembly step, the tube and fin stacking body discharge step, and the tube and fin stacking body transfer step may be repeatedly performed, such that the tube and fin stacking body of one core amount may be continuously manufactured at a specific cycle. In addition, while the tube storing step is being performed in the process of repeating the above steps, the tube and fin assembly step or the tube and fin stacking body discharge step or the tube and fin stacking body transfer step may be performed simultaneously.

Therefore, according to the present invention, the transfer time and the assembly time of the tubes and the fins may be reduced by supplying the plurality of tubes at one time and supplying the plurality of fins at one time to assemble a large number of tubes and a large number of fins at one time, thereby improving the productivity of the heat exchanger and reducing the manufacturing cost of the heat exchanger.

Figure 20:
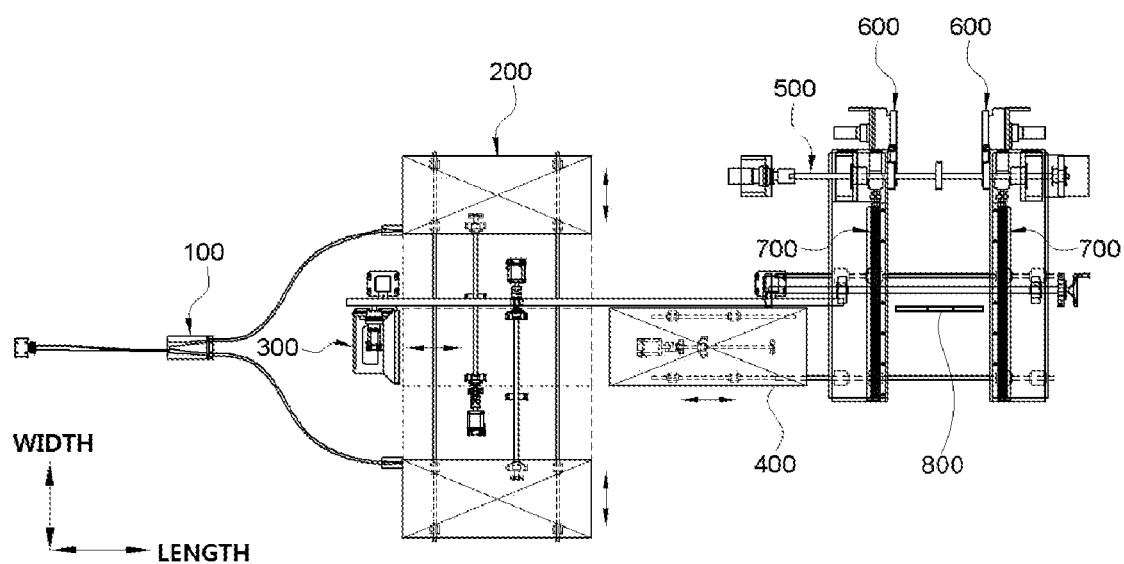
FIG. 20 is a top plan view illustrating a heat exchanger automatic assembly apparatus further including a fin supply part for supplying a plurality of fins at one time in the automatic heat exchanger assembling apparatus according to another embodiment of the present invention.

FIG. 20 is a top plan view illustrating a heat exchanger automatic assembly apparatus including both the heat exchanger automatic assembly apparatus according to an embodiment of the present invention and the heat exchanger automatic assembly apparatus according to another embodiment of the present invention.

Referring to FIG. 20, the guide part 400 of the fin supply part constituted by the fin distribution unit 100, the fin transfer unit 200, the fin discharge unit 300, and the guide part 400 is disposed to be adjacent to a side surface of the tube and fin transfer unit 700 in the length direction, such that the plurality of tubes may be supplied onto the tube and fin transfer unit 700 through the guide part 400 at one time.

Since the heat exchanger automatic assembly apparatus and method according to the present invention may continuously supply the fins to the fin trays without stopping the supply of the fins to the fin trays and discharge the plurality of fins at one time to allow the fins to be interposed between the tubes arranged to be spaced apart from each other, the supply time of the fin may be reduced to improve productivity, and the discarded fins may be reduced to reduce the manufacturing cost.

In addition, since the heat exchanger automatic assembly apparatus and method according to the present invention reduces the transfer time and the assembly time of the tubes and the fins by supplying the plurality of tubes at one time and supplying the plurality of fins at one time to assemble a large number of tubes and a large number of fins at one time, the productivity of the heat exchanger may be improved and the manufacturing cost of the heat exchanger may be reduced.

The present invention is not limited to the abovementioned exemplary embodiments, but may be variously applied. In addition, the present invention may be variously modified by those skilled in the art to which the present invention pertains without departing from the gist of the present invention claimed in the claims.

DETAILED DESCRIPTION OF MAIN ELEMENTS

100: fin distribution unit
110: fin introduction line
121: first fin distribution line
122: second fin distribution line
130: redirection apparatus
131: branch portion
132: switching means
200: fin transfer unit
210: first fin tray
220: second fin tray
230: first tray driving means
240: second tray driving means
250: LM guide
300: fin discharge unit
310: pusher
320: pusher driving means
400: guide part
410: guide tray
420: guide tray driving means
500: tube supply unit
510: single tube supply apparatus
520: rotation shaft
530: driving means
600: tube transfer unit
610: tube shuttle
620: shuttle vertical movement means
630: shuttle driving means
700: tube and fin transfer unit
710: feeding screw
720: screw driving means
800: tube and fin discharge unit

What is claimed is:

1. A heat exchanger automatic assembly apparatus comprising:
   a fin introduction line providing an introduction path through which fins are introduced into the heat exchanger automatic assembly apparatus and a first fin distribution line and a second fin distribution line respectively providing a first distribution path and a second distribution path through which the fins are supplied to a fin transfer unit;
   the fin transfer unit connected to the first fin distribution line and the second fin distribution line, the fin transfer unit including:
      two or more fin trays in which the fins supplied by the first fin distribution line and the second fin distribution line to the fin transfer unit are stored, and
      a tray driving means connected to the two or more fin trays to selectively transfer the two or more fin trays to a predetermined position; and
   a fin discharge unit discharging the fins stored in the two or more fin trays of the fin transfer unit to the predetermined position, the fin discharge unit including:
      a pusher for pushing the fins and disposed on a first line that intersects a second line connecting the first fin tray and the second fin tray; and
      a pusher driving means connected to the pusher to move the pusher in a direction intersecting the second line and return the pusher to an original position.

2. The heat exchanger automatic assembly apparatus of claim 1, further comprising a guide part disposed on a third line through which the pusher of the fin discharge unit is moved and disposed to be adjacent to the fin transfer unit to guide the discharge of the fins pushed by the pusher.

3. The heat exchanger automatic assembly apparatus of claim 2, wherein the guide part includes:
   a guide tray guiding and storing the fins discharged from the fin transfer unit; and
   a guide tray driving means connected to the guide tray to move the guide tray in the direction intersecting the second line.

4. The heat exchanger automatic assembly apparatus of claim 1, wherein a combination of the first fin distribution line and the second fin distribution line continuously supplies the fins to the fin transfer unit.

5. The heat exchanger automatic assembly apparatus of claim 1, wherein the fins stored in the two or more fin trays of the fin transfer unit are arranged in columns, and the fin discharge unit discharges fins stored in a same column to the predetermined position at one time.

6. The heat exchanger automatic assembly apparatus of claim 1, further comprising:
   a switching means coupled to the fin introduction line and operable such that the introduction path provided by the fin introduction line connects to either the first distribution path provided by the first fin distribution line or the second distribution path provided by the second fin distribution line.

7. The heat exchanger automatic assembly apparatus of claim 1, wherein:
   the first fin tray and the second fin tray are disposed to be adjacent to a discharge point of the first fin distribution line and a discharge point of the second fin distribution line, respectively, and are disposed to be spaced apart from each other; and
   the tray driving means includes a first tray driving means and a second tray driving means connected to the first fin tray and the second fin tray, respectively, to move the first fin tray and the second fin tray to a position between the first fin tray and the second fin tray facing each other and return the first fin tray and the second fin tray to respective original positions.

* * * * *